US012063324B2

United States Patent
Sugimoto et al.

(10) Patent No.: US 12,063,324 B2
(45) Date of Patent: Aug. 13, 2024

(54) CALL ALERT DEVICE, CALL ALERT SYSTEM, CALL ALERT METHOD, AND CALL ALERT PROGRAM

(71) Applicant: Nippon Telegraph and Telephone Corporation, Tokyo (JP)

(72) Inventors: Shun Sugimoto, Musashino (JP); Hiroshi Shimizu, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 117 days.

(21) Appl. No.: 17/790,687

(22) PCT Filed: Jan. 6, 2020

(86) PCT No.: PCT/JP2020/000032
§ 371 (c)(1),
(2) Date: Jul. 1, 2022

(87) PCT Pub. No.: WO2021/140538
PCT Pub. Date: Jul. 15, 2021

(65) Prior Publication Data
US 2023/0057127 A1 Feb. 23, 2023

(51) Int. Cl.
*H04M 15/00* (2024.01)
*H04M 3/42* (2006.01)
*H04M 7/00* (2006.01)

(52) U.S. Cl.
CPC ............ *H04M 15/47* (2013.01); *H04M 3/42* (2013.01); *H04M 3/42059* (2013.01); *H04M 7/0078* (2013.01)

(58) Field of Classification Search
None
See application file for complete search history.

(56) References Cited

U.S. PATENT DOCUMENTS 7,724,884 B1 * 5/2010 Bilder ................ H04M 3/5322
379/100.06
10,701,204 B2 * 6/2020 Corfield ............... H04M 15/88
(Continued)

FOREIGN PATENT DOCUMENTS

JP 2006304126 11/2006
JP 2012165285 8/2012
(Continued)

OTHER PUBLICATIONS

The Telecommunication Technology Committee, "Common interconnection interface between IMS operator's networks, 5th edition," TTC standard, Aug. 29, 2018, p. 23, 5 pages (with English Translation).

*Primary Examiner* — Quoc D Tran
(74) *Attorney, Agent, or Firm* — Fish & Richardson P.C.

(57) ABSTRACT

When an SIP server receives a call signal addressed to a callee side terminal, the SIP server transmits a warning signal to the callee side terminal before transmitting the call signal to the callee side terminal when an international call identifier indicating that the call signal passes through a foreign country is set in the call signal. In addition, when the SIP server receives the call signal addressed to the callee side terminal, the SIP server includes a warning that the caller number is disguised in a warning signal when an international call identifier indicating that the call signal passes through a foreign country is set in the call signal and the caller number of the call signal is a number from a country in which the callee side terminal is located.

5 Claims, 6 Drawing Sheets

(56) References Cited

U.S. PATENT DOCUMENTS

| | | | | |
|---|---|---|---|---|
| 11,184,481 | B1* | 11/2021 | Botner | H04L 65/1046 |
| 2006/0229060 | A1* | 10/2006 | Gruchala | H04M 15/88 |
| | | | | 455/406 |
| 2013/0163736 | A1* | 6/2013 | Petronelli | H04W 4/24 |
| | | | | 379/142.04 |
| 2013/0343230 | A1* | 12/2013 | Manyakin | H04W 4/16 |
| | | | | 370/259 |
| 2015/0189080 | A1* | 7/2015 | Lin | H04M 3/4365 |
| | | | | 379/142.05 |
| 2020/0322483 | A1* | 10/2020 | Anand | H04M 3/543 |
| 2023/0033572 | A1* | 2/2023 | Sugimoto | H04M 3/58 |

FOREIGN PATENT DOCUMENTS

| | | |
|---|---|---|
| JP | 2013077951 | 4/2013 |
| JP | 2016163303 | 9/2016 |

* cited by examiner

CALL ALERT DEVICE, CALL ALERT SYSTEM, CALL ALERT METHOD, AND CALL ALERT PROGRAM

CROSS-REFERENCE TO RELATED APPLICATIONS

This application is a National Stage application under 35 U.S.C. § 371 of International Application No. PCT/JP2020/000032, having an International Filing Date of Jan. 6, 2020, the disclosure of which is considered part of the disclosure of this application, and is incorporated by reference in its entirety into this application.

TECHNICAL FIELD

The present invention relates to a call warning apparatus, a call warning system, a call warning method, and a call warning program.

BACKGROUND ART

In recent years, the number of special scam cases has increased greatly, and "It's me" telephone scams (which are scams in which scammers pretend to be a victim's son saying "It's me") account for more than half of all scams; therefore, there has been a demand for countermeasures against scams using the telephone. In addition, as IP networks have become widespread, there have been cases where call signals of special scams may sometimes be transmitted on the networks as Session Initiation Protocol (SIP) signals.

PTL 1 describes a method for a communication system that controls calls using SIPs in which guidance is provided to a user who receives a call before end-to-end media connection between a caller terminal and a callee terminal. This allows a callee to operate as requested by the guidance or the like to determine whether a connection is possible.

PTL 2 describes a telephone call system in which evaluation information of a caller terminal is provided to a callee terminal before the callee terminal responds to a call from the caller terminal, and then the callee terminal communicates with the caller terminal. In this way, the callee terminal can appropriately select scenarios to receive a call or disconnect a call according to an instruction of the callee, such as rejecting a call from a caller terminal having a poor evaluation, receiving a call from a caller terminal having a good evaluation.

CITATION LIST

Patent Literature

PTL 1: JP 2012-165285 A
PTL 2: JP 2016-163303 A

SUMMARY OF THE INVENTION

Technical Problem

In a method of registering attackers on a blacklist in the related art, caller numbers that are identified as having been used in special scams need to be registered in advance and the like. Thus, when an attacker frequently changes caller numbers, the blacklist may become obsolete, which may make it difficult to adequately cope with such special scams. Thus, using other approaches indicating the calling tendencies of special scams needs to be considered, rather than directly indicating the attacker, such as indicating the caller number.

FIG. 6 is a configuration diagram illustrating an overview of a special scam attack from a foreign country.
An example in which an outgoing call from a caller side terminal $11z$ passes through three SIP servers an SIP server $21z \rightarrow$ an SIP server $22z \rightarrow$ an SIP server $23z$) to reach a callee side terminal $31z$ is illustrated. Here, the country in which the callee side terminal $31z$ is used is assumed to be the home county, focusing on the callee using the callee side terminal $31z$.
A foreign service provider $21Dz$ manages the SIP server $21z$ covering the caller side terminal $11z$. An international connection service provider $22Dz$ manages the SIP server $22z$. A domestic service provider $23Dz$ manages the SIP server $23z$ covering the callee side terminal $31z$. That is, the SIP server $22z$ relays calls across the two countries.

Here, an attacker often abuses such a caller side terminal $11z$ to delay identification (tracking) which reveals that the attacker is a special scam caller. Thus, it would be beneficial to use information of whether a call is an outgoing call from a foreign country to the home country as a clue indicating the call tendency of a special scam. However, such clues have not been used in the related art.

Thus, the present invention has the main task of issuing a suitable warning even when a special scam frequently changes call numbers.

Means for Solving the Problem

In order to accomplish the task, a call warning apparatus of the present invention has the following features.
According to the present invention, when a call warning apparatus receives a call signal addressed to a callee side terminal, the call warning apparatus transmits a warning signal to the callee side terminal before transmitting the call signal to the callee side terminal when an international call identifier indicating that the call signal passes through a foreign country is set in the call signal

Effects of the Invention

According to the present invention, a suitable warning can be issued even when a special scam frequently changes the call numbers.

DESCRIPTION OF EMBODIMENTS

Hereinafter, an embodiment of the present invention will be described in detail with reference to the drawings.

Figure 1:
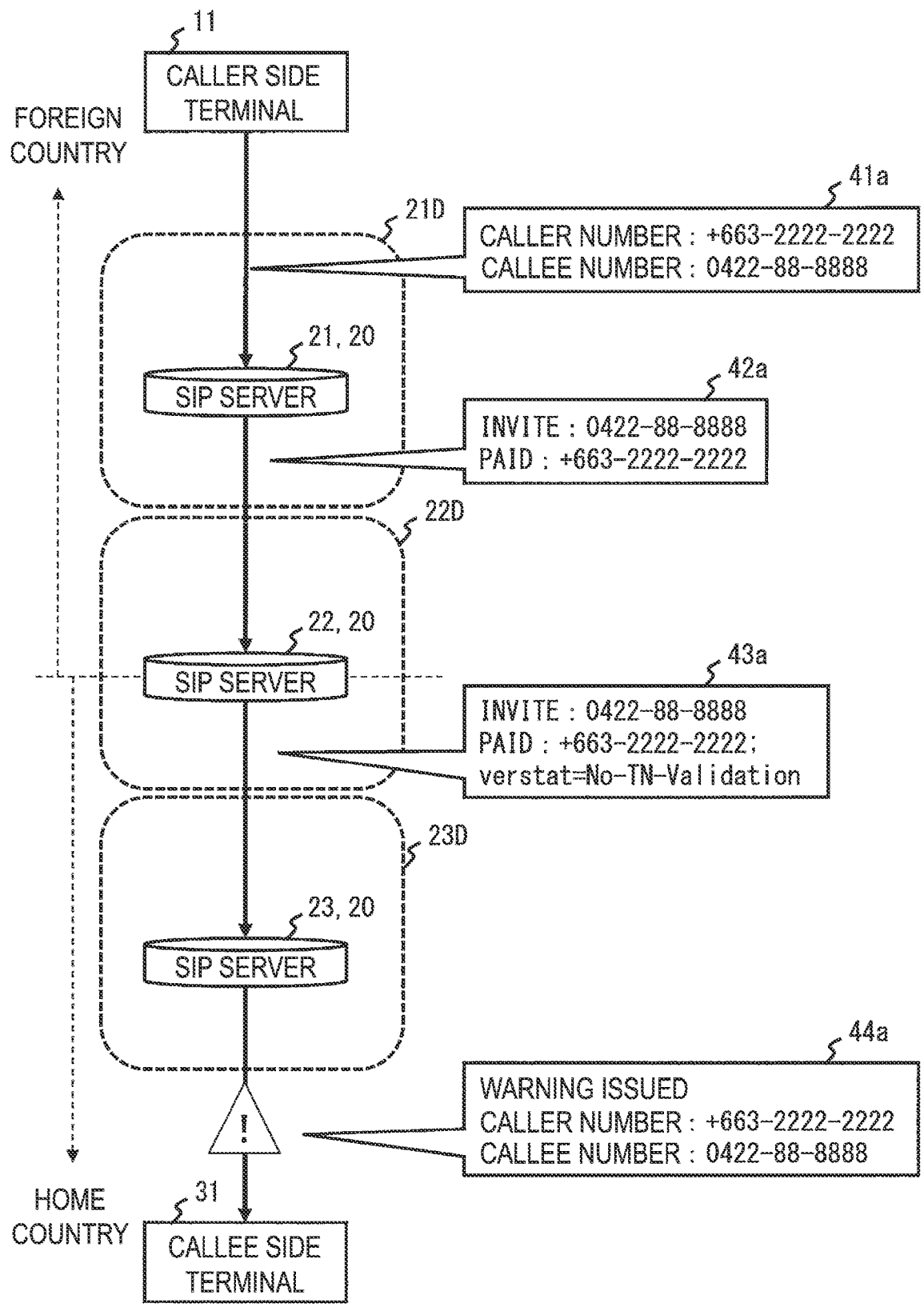
FIG. 1 is a configuration diagram of a call warning system according to the present embodiment.

FIG. 1 is a configuration diagram of a call warning system.

Figure 6:
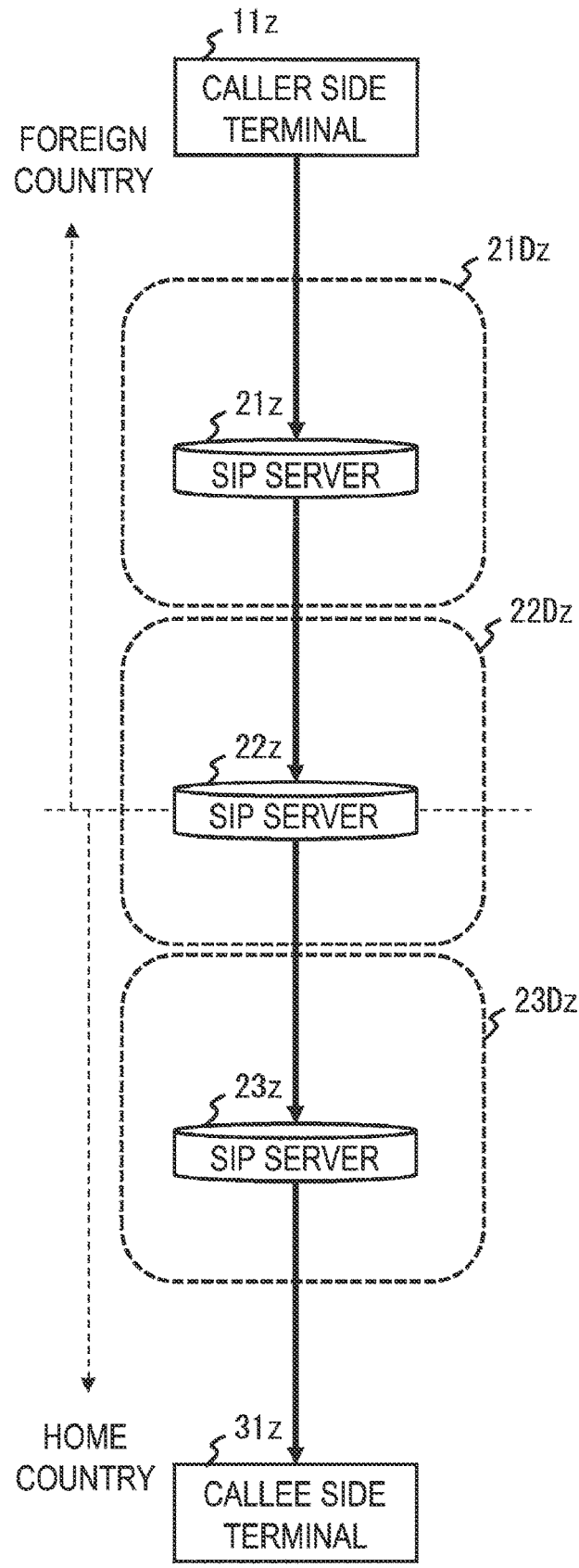
FIG. 6 is a configuration diagram illustrating an overview of a special scam attack from a foreign country.

An example in which a call signal 41a from a caller side terminal 11 passes through three SIP servers 20 (an SIP server 21→(an SIP signal 42a)→an SIP server 22→(an SIP signal 43a)→an SIP server 23) to reach a callee side terminal 31 as a call signal 44a as in FIG. 6 is illustrated. Here, the country in which the callee side terminal 31 is used is assumed to be the home country, focusing on the callee using the callee side terminal 31.

A foreign service provider 21D manages the SIP server 21 covering the caller side terminal 11. An international connection service provider 22D manages the SIP server (international connection apparatus) 22. A domestic service provider 23D manages the SIP server (call warning apparatus) 23 covering the callee side terminal 31. That is, the SIP server 22 relays calls across the two countries.

Here, because calls of the "it's me" scam may be made from foreign countries to the home country, if the call signal 44a arriving at the callee side terminal 31 is a call (the call signal 41a) coming from a foreign country to the home country, the SIP server 23 transmits guidance (a warning signal) to warn the callee side terminal 31 before starting the call.

In other words, if an international call identifier indicating a call coming from a foreign country is set in the SIP signal 43a relayed from the SIP server 22 on the upstream side, the SIP signal 23 determines that the call is coming from a foreign country and transmits guidance with the call signal 44a before starting the call. Further, a specific SIP procedure to transmit guidance before starting a call is described in PTL 1.

Thus, when the SIP server 22 relays the call across the two countries, the SW server 22 sets an international call identifier in the received SIP signal 42a, and then transmits the signal as the SIP signal 43a to the relay destination. The international call identifier is set as, for example, "verstat=No-TN-Validation" in the P-Asserted-Identity header (hereinafter referred to as a "PAID header") indicating caller number information of the SIP signal 43a.

The international call identifier is information distributed between service providers like the international connection service provider 22D and the domestic service provider 23D, and thus it is not affected even if the information (caller number) other than that of the service providers is changed frequently.

Further, "verstat=No-TN-Validation" is an identifier indicating that the caller number has not been verified. The standardization document JJ-90.30 (Common Interconnection Interface between IMS Operator's Networks) prepared by the Telecommunication Technology Committee stipulates that the identifier should be added to an caller number provided by the foreign service provider 21D.

That is, the SIP server 22 of the international connection service provider 22D is obligated to add "verstat=No-TN-Validation" when the SIP server 22 relays a call across two countries.

Figure 2:
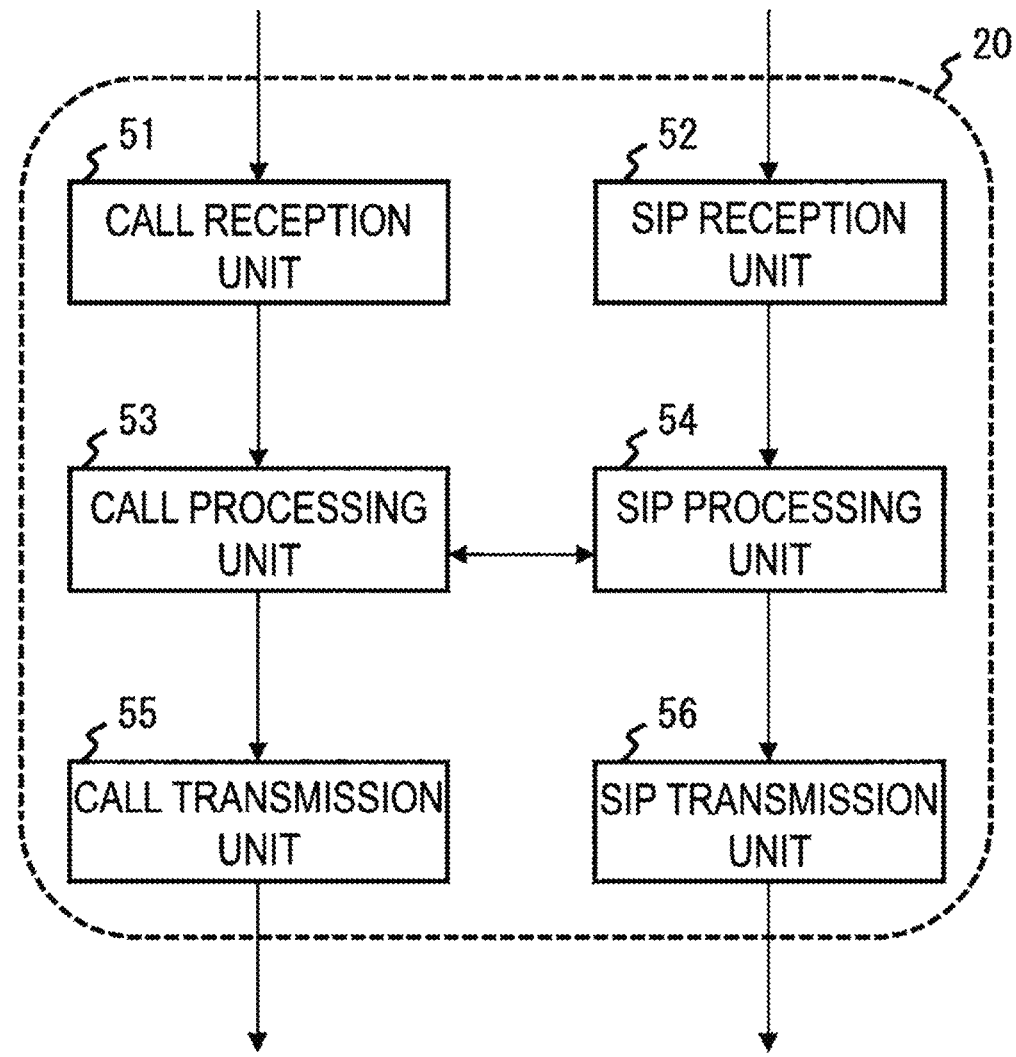
FIG. 2 is a configuration diagram of an SIP server according to the present embodiment.

FIG. 2 is a configuration diagram of an SIP server 20.

The SIP server 20 includes a call reception unit 51, an SIP reception unit 52, a call processing unit 53, an SIP processing unit 54, a call transmission unit 55, and an SIP transmission unit 56. Hereinafter, processing of the SIP server 20 will be described along with the details of each signal (the call signals 41a and 44a, and the SIP signals 42a and 43a) in FIG. 1.

First, the SIP server 21 of the foreign service provider 21) will be described.

The call reception unit 51 of the SIP server 21 receives the call signal 411a from the caller side terminal 11. The call signal 41a includes an caller number "+663-2222-2222" of the caller side terminal 11 and a callee number "0422-88-8888" of the callee side terminal 31.

The call processing unit 53 recognizes that the callee number of the received call signal 41a is addressed to another country. The SIP processing unit 54 creates an SIP signal 42a (INVITE and PAID) from the call signal 41a (caller number and callee number). The SIP transmission unit 56 relays the created SIP signal 42a to the SIP server 22 of the international connection service provider 22D.

Next, the SIP server 22 of the international connection service provider 22D will be described.

The SIP reception unit 52 of the SIP server 22 receives the SIP signal 42a from the SIP server 21, The SIP processing unit 54 recognizes that the callee number (INVITE) of the received SIP signal 42a is addressed to a different country from that of the caller number (PAID).

The SIP processing unit 54 creates the SIP signal 43a by adding "verstat=No-TN-Validation" to the SIP signal 42a as an international call identifier. The SIP transmission unit 56 relays the created SIP signal 43a to the SIP server 23 of the domestic service provider 23D.

In addition, the SIP server 23 of the domestic service provider 23D will be described. The SIP reception unit 52 of the SIP server 23 receives the SIP signal 43a from the SIP server 22. The SIP processing unit 54 recognizes that the callee number of the received SIP signal 43a is to be processed by itself. Here, the SIP processing unit 54 recognizes that a warning is needed because the SIP signal 43a includes an international call identifier.

The call processing unit 53 converts the SIP signal 43a (INVITE and PAID) into the call signal 44a (caller number and callee number). Then, the call transmission unit 55 transmits guidance for warning to the callee side terminal 31 before starting a call of the call signal 44a.

Figure 3:
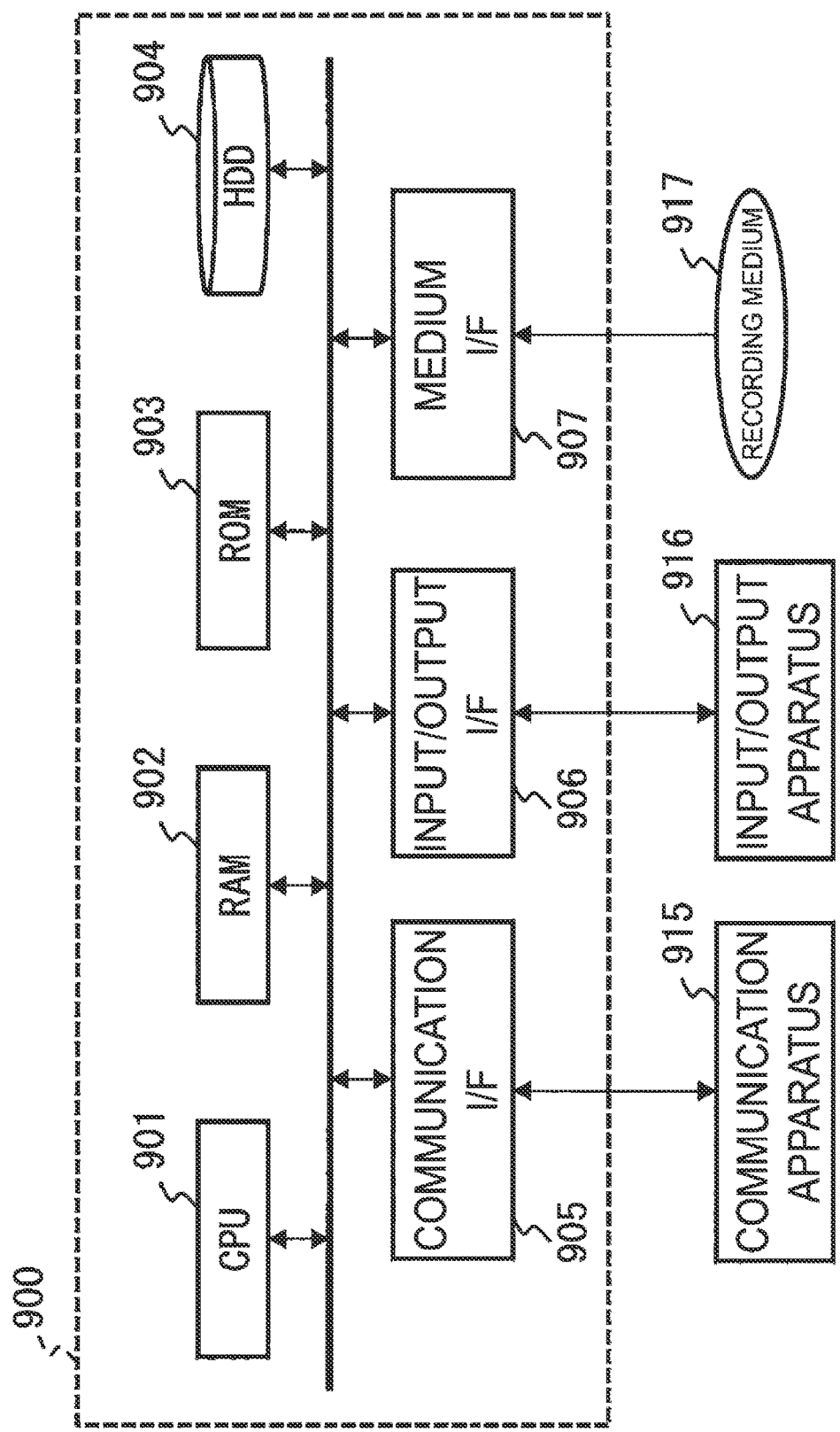
FIG. 3 is a configuration diagram of hardware of the SIP server according to the present embodiment.

FIG. 3 is a hardware configuration diagram of the SIP server 20.

The SIP server 20 is configured as a computer 900 including a CPU 901, a RAM 902, a ROM 903, an HDD 904, a communication I/F 905, an input/output I/F 906, and a medium I/F 907. The communication I/F 905 is connected to an external communication apparatus 915. The input/output I/F 906 is connected to an input/output apparatus 916. The medium I/F 907 reads and writes data from a recording medium 917. Further, the CPU 901 controls the processing units by executing a program (also referred to as an application or an app that is an abbreviation thereof) read into the RAM 902. In addition, the program can also be distributed through a communication line or recorded and distributed on the recording medium 917 such as a CD-ROM.

Figure 4:
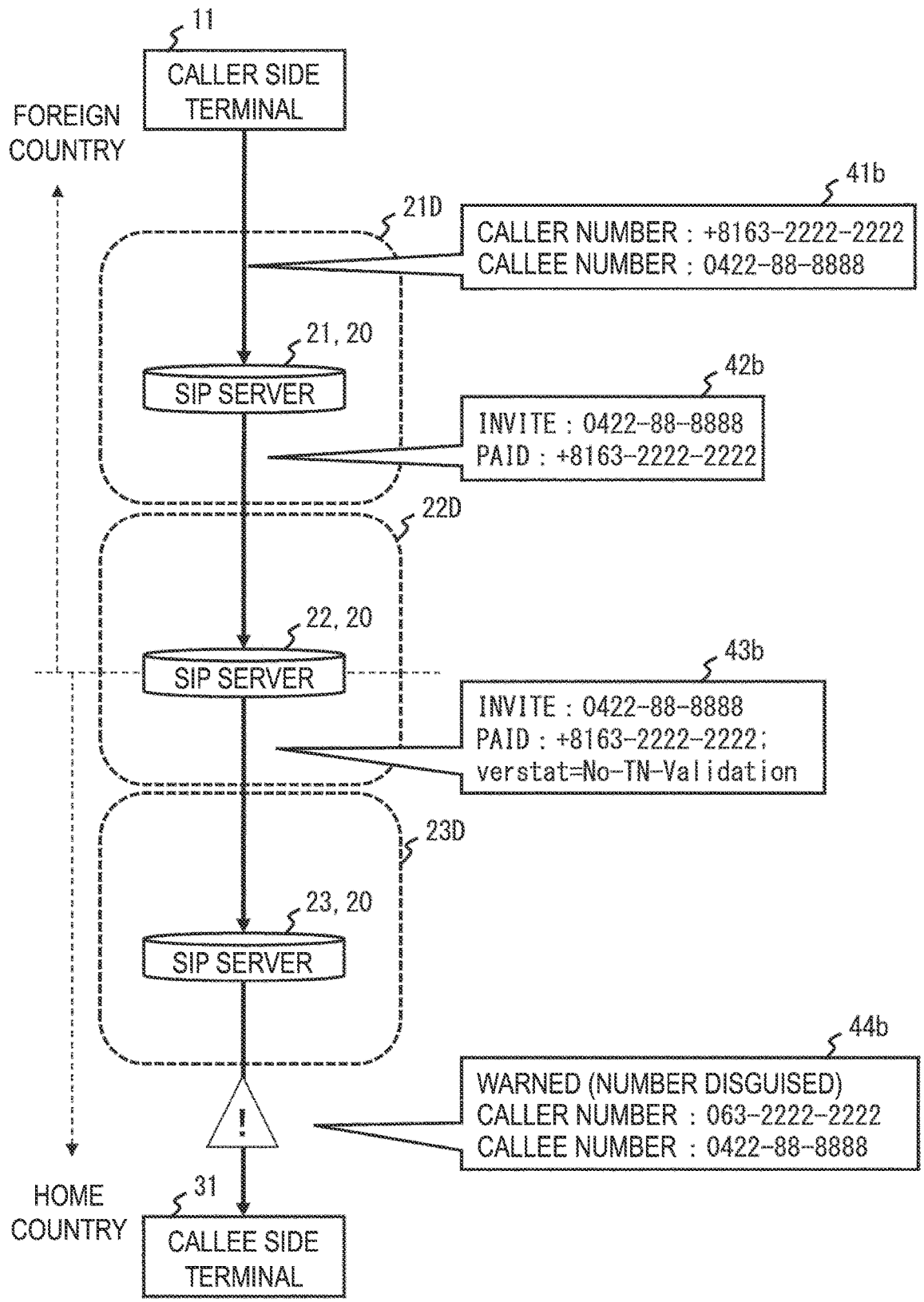
FIG. 4 is a configuration diagram of a case in which the caller number is further disguised in the special scam attack of FIG. 1 according to the present embodiment.

FIG. 4 is a configuration diagram of a case in which the caller number of the special scam attack of FIG. 1 is further disguised.

A difference is that, although the call signal 41a in FIG. 1 includes the caller number "+663-2222-2222" of the caller side terminal 11 without disguise, the call signal 41b in FIG. 4 includes a disguised caller number "+8163-2222-2222" of the caller side terminal 11. Further, a number starting with "+81" is perceived as a domestic phone number for the callee side terminal 31. In addition, SIP signals 42b and 43b in FIG. 4 also include the disguised caller number "+8163-2222-2222" of the caller side terminal 11, unlike the SIP signals 42a and 43a in FIG. 1.

Further, even for an outgoing call with a disguised caller number, the caller number (PAID) to be notified to the callee based on the SIP signal and information indicating the actual location of the caller are managed in separate headers. For this reason, there is a risk that the call of the special scam will be connected between the caller side terminal 11 and the callee side terminal 31 in the SIP servers 20 that the call passes through, with the disguised outgoing call not being able to be excluded.

Processing of the SIP server 21 and the SIP server 22 in the case of FIG. 4 is the same as in FIG. 1. The SIP server 23 of the domestic service provider 23D in the case of FIG. 4 will be described below.

The SIP reception unit 52 of the SIP server 23 receives an SIP signal 43h from the SIP server 22.

The SIP processing unit 54 recognizes that the callee number of the received SIP signal 43b is to be processed by itself.

Here, the SIP processing unit 54 determines to warn that the outgoing call is from a foreign country (first warning) before starting the call based on the fact that the SIP signal 43b includes an international call identifier. In addition, when the caller number (PAID) of the SIP signal 43b is a domestic call number (number starts with "+81") although it includes an international call identifier, the SIP processing unit 54 determines to warn that the caller number is disguised (second warning).

The SIP processing unit 54 converts the SIP signal 43b (INVITE and PAID) into a call signal 44b (caller number and callee number). Then, the call transmission unit 55 transmits guidance to the callee side terminal 31 to issue the second warning in addition to the first warning before starting the call of the call signal 44b.

An example in which a suitable warning is issued as guidance when an ill-intentioned attacker launches a special scam attack against the callee side terminal 31 from the caller side terminal 11 has been described above with reference to FIGS. 1 to 4.

Meanwhile, a user who makes a call to the callee side terminal 31 includes not only an ill-intentioned attacker but also a regular user. Thus, an example in which a warning is not erroneously issued to a regular user will be described.

Figure 5:
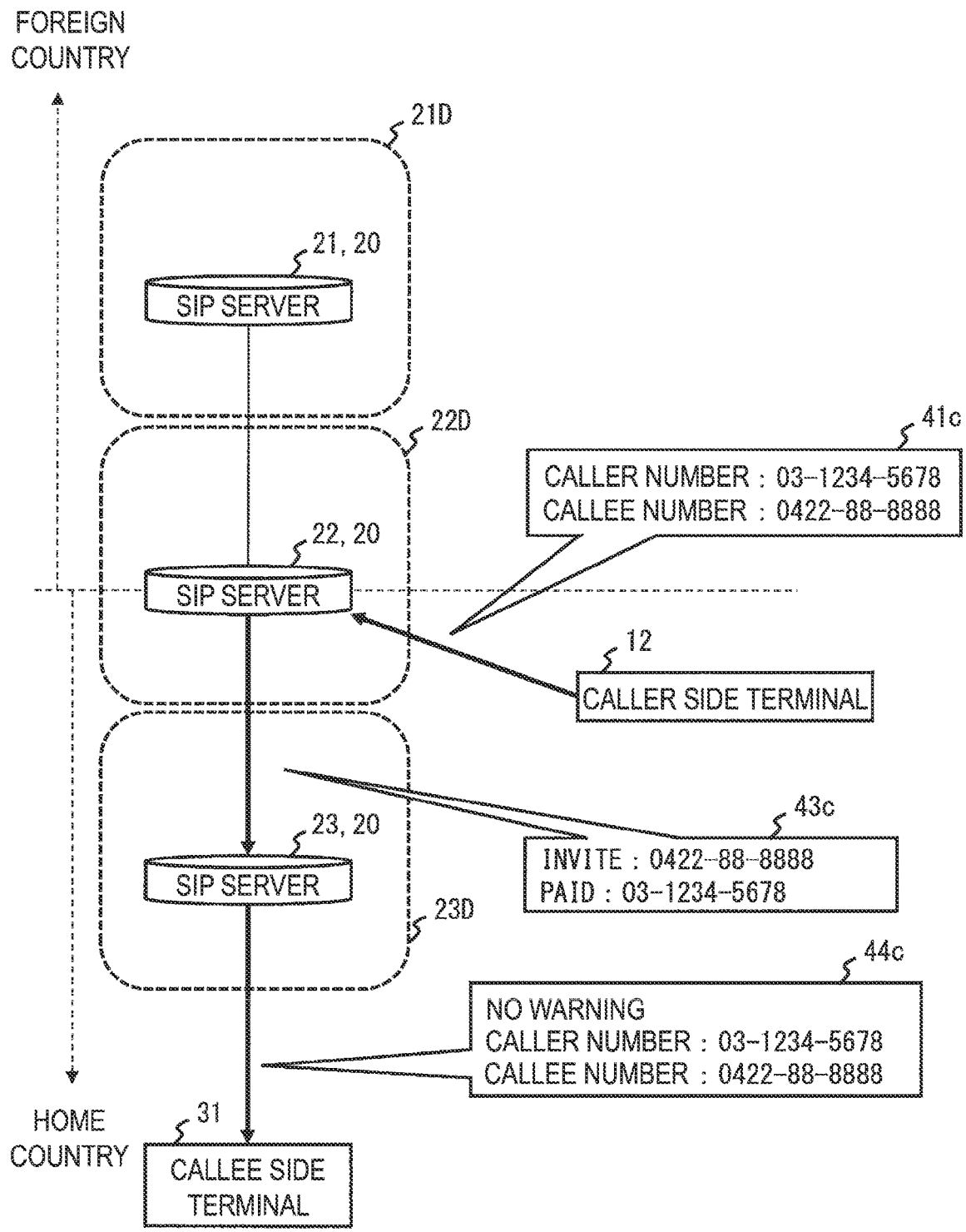
FIG. 5 is a configuration diagram of a case in which a regular phone call is made in the call warning system of FIG. 1 according to the present embodiment.

FIG. 5 is a configuration diagram of a case in which a regular phone call is made in the call warning system of FIG. 1.

First, although the caller side terminal 11 used by the attacker is covered by the SIP server 21 of the foreign country in FIG. 1, the caller side terminal 12 used by a regular user in FIG. 5 is assumed to be covered by the SIP server 22 on the domestic side.

The call reception unit 51 of the SIP server 22 receives a call signal 41c from the caller side terminal 12. The call signal 41c includes an caller number "03-1234-5678" of the caller side terminal 12 and the callee number "0422-88-8888" of the callee side terminal 31.

The call processing unit 53 recognizes that the callee number of the received call signal 43c is addressed to the home country. Thus, the SIP processing unit 54 creates an SIP signal 43c INVITE and PAID) from the call signal 41c (caller number and callee number) without adding an international call identifier to the signal. The SIP transmission unit 56 relays the created SIP signal 43c to the SIP server 23.

The SIP reception unit 52 of the SIP server 23 receives the SIP signal 43c from the SIP server 22. The SIP processing unit 54 recognizes that the callee number of the received SIP signal 43c is to be processed by itself. Here, the SIP processing unit 54 recognizes that no warning is needed because the SIP signal 43c includes no international call identifier.

The call processing unit 53 converts the SIP signal 43c (INVITE and PAID) into a call signal 44c (caller number and cal lee number). Then, the call transmission unit 55 transmits the call signal 44c with no warning to the callee side terminal 31.

Effects

According to the present invention, when the SIP server 23 receives the SIP signal 43a addressed to the callee side terminal 31 and an international call identifier indicating that the signal has passed through a foreign country is set in the SIP signal 43a, a warning signal is transmitted to the callee side terminal 31 before the SIP signal 43a is transmitted to the callee side terminal 31.

This allows a warning to be given to a callee without using previously obtained attacker information (blacklist), and thus countermeasures can be taken against a trick of frequently changing numbers by giving a warning in real time. In addition, a callee who is unfamiliar with a foreign phone number can also be clearly warned that it is a call from a foreign country.

According to the present invention, when the SIP server 23 receives the SIP signal 43a addressed to the callee side terminal 31, when an international call identifier indicating that the signal has passed through a foreign county is set in the Sip signal 43a and the caller number of the Sip signal 43a is a number coming from the same county as that of the callee side terminal 31, a warning that the caller number has been disguised is included a warning signal.

Thus, a normal call with an caller number can be distinguished from a call with a disguised caller number, a stronger warning can be issued to such a disguised call, and thus a call of the special scam from a malicious person can be detected and warned of.

The present invention relates to a call warning system including the SIP server 23 and the SIP server 22, in which, when the SIP server 22 receives the SIP signal 43a from a country different from the country in which the callee side terminal 31 is located, the SIP server 22 sets, in the SIP signal 43a, an international call identifier indicating that it has passed through a foreign country and then relays the SIP signal 43a to the SIP server 23.

This ensures that the international call identifier is set in the SIP signal 43a that has passed through a foreign country.

According to the present invention, the SIP server 22 sets an identifier of the PAID header indicating that the caller number of the SIP signal 43a is not verified to the SIP signal 43a as an international call identifier.

This allows the SIP server 22 to use the existing servers as they are and add only the warning determination logic of the SIP server 23 by using existing implementation (No-TN-Validation indicating as being not verified) in the foreign identifier.

REFERENCE SIGNS LIST 11, 12 Caller side terminal
20, 21 SIP server
21D Foreign service provider
22 SIP server (international connection apparatus)
22D International connection service provider
23 SIP server (call warning apparatus)
23D Domestic service provider
31 Callee side terminal
41,44 Call signal
42,43 SIP signal (call signal)

51 Call reception unit
52 SIP reception unit
53 Call processing unit
54 SIP processing unit
55 Call transmission unit
56 SIP transmission unit

The invention claimed is:

1. A call warning apparatus, comprising at least one processor, configured to perform operations comprising:
   receiving a call signal addressed to a callee side terminal;
   detecting an international call identifier in the call signal, wherein the international call identifier indicates that the call signal passes through a foreign country and a caller number of the call signal is not verified, wherein the international call identifier is included in a P-Asserted-Identity (PAID) header of the call signal; and
   in response to detecting the international call identifier, transmitting, to the callee side terminal, a warning signal before transmitting the call signal to the callee side terminal, wherein the warning signal includes information that the call signal is from the foreign country.

2. The call warning apparatus according to claim 1, the operations further comprising:
   determining that the call signal includes the caller number indicating that the call signal is from a domestic country; and
   transmitting, to the callee side terminal, an additional warning signal before transmitting the call signal to the callee side terminal, wherein the additional warning signal includes information that the caller number is a disguised caller number.

3. The call warning apparatus according to claim 1, wherein the international call identifier is "verstat=No-TN-Validation".

4. A call warning method, comprising:
   receiving a call signal addressed to a callee side terminal;
   detecting an international call identifier in the call signal, wherein the international call identifier indicates that the call signal passes through a foreign country and a caller number of the call signal is not verified, wherein the international call identifier is included in a P-Asserted-Identity (PAID) header of the call signal; and
   in response to detecting the international call identifier, transmitting, to the callee side terminal, a warning signal before transmitting the call signal to the callee side terminal, wherein the warning signal includes information that the call signal is from the foreign country.

5. A non-transitory computer readable medium storing instructions of a call warning program that, upon execution, cause a computer serving as a call warning apparatus to perform operations comprising:
   receiving a call signal addressed to a callee side terminal;
   detecting an international call identifier in the call signal, wherein the international call identifier indicates that the call signal passes through a foreign country and a caller number of the call signal is not verified, wherein the international call identifier is included in a P-Asserted-Identity (PAID) header of the call signal; and
   in response to detecting the international call identifier, transmitting, to the callee side terminal, a warning signal before transmitting the call signal to the callee side terminal, wherein the warning signal includes information that the call signal is from the foreign country.

* * * * *